US012090866B2

(12) United States Patent
Janarthanam et al.

(10) Patent No.: US 12,090,866 B2
(45) Date of Patent: Sep. 17, 2024

(54) TRACTION BATTERY CIRCUIT INTERRUPTER ASSEMBLY AND INTERRUPTION METHOD

(71) Applicant: Ford Global Technologies, LLC, Dearborn, MI (US)

(72) Inventors: Suriyaprakash Ayyangar Janarthanam, Canton, MI (US); John Marshall, Belleville, MI (US); Vijay Pachore, Troy, MI (US); Micah Smith, Detroit, MI (US); Brian D. Bishop, Ira Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 402 days.

(21) Appl. No.: 17/498,120

(22) Filed: Oct. 11, 2021

(65) Prior Publication Data

US 2023/0115154 A1    Apr. 13, 2023

(51) Int. Cl.
*B60L 50/64* (2019.01)
*B60L 3/04* (2006.01)
(Continued)

(52) U.S. Cl.
CPC ............. *B60L 50/64* (2019.02); *B60L 3/04* (2013.01); *B60L 50/51* (2019.02); *B60L 58/10* (2019.02);
(Continued)

(58) Field of Classification Search
CPC .. B60L 50/64; B60L 3/04; B60L 50/51; B60L 58/10; B60L 2220/10;
(Continued)

(56) References Cited

U.S. PATENT DOCUMENTS

| 10,446,814 B2 | 10/2019 | Gross et al. |
| 2009/0156032 A1* | 6/2009 | Jetter .................. B60L 3/04 |
| | | 439/152 |

(Continued)

FOREIGN PATENT DOCUMENTS

| CN | 104527446 B | 9/2016 |
| CN | 105270181 B | 8/2017 |

(Continued)

OTHER PUBLICATIONS

Texas Instruments, Automotive High-Voltage Interlock Reference Design, TI Designs: TIDA-01445, Sep. 2017—Revised Apr. 2018, p. 1-38.

*Primary Examiner* — Alan D Hutchinson
(74) *Attorney, Agent, or Firm* — David B. Kelley; Carlson, Gaskey & Olds, P.C.

(57) ABSTRACT

A traction battery assembly according to an exemplary aspect of the present disclosure includes a traction battery, an electric machine, an electrical harness assembly, a protrusion adjacent the electrical harness assembly. The protrusion is configured to move from a first position to a second position in response to a loading event. When the protrusion is in the first position, the electric machine is electrically coupled to the traction battery through the electrical harness assembly. When the protrusion is in the second position, the electric machine is electrically decoupled from the traction battery.

18 Claims, 3 Drawing Sheets

(51) Int. Cl.
 *B60L 50/51* (2019.01)
 *B60L 58/10* (2019.01)
 *B60R 16/02* (2006.01)
 *H01R 13/629* (2006.01)
(52) U.S. Cl.
 CPC ... *B60R 16/0207* (2013.01); *H01R 13/62933* (2013.01); *B60L 2220/10* (2013.01); *H01R 2201/26* (2013.01)
(58) Field of Classification Search
 CPC ...... B60L 3/0046; B60L 3/0061; B60L 50/66; B60L 3/0007; B60R 16/0207; H01R 13/62933; H01R 2201/26; H01R 13/635; H01R 13/707; Y02T 10/70
 See application file for complete search history.

(56) References Cited

U.S. PATENT DOCUMENTS

2010/0187904 A1\* 7/2010 Lucas .................... B60L 58/20
 307/328
2020/0066465 A1\* 2/2020 Moszynski .............. H01H 9/32

FOREIGN PATENT DOCUMENTS

CN 208232851 U 12/2018
JP 2013/524454 \* 6/2013

\* cited by examiner

TRACTION BATTERY CIRCUIT INTERRUPTER ASSEMBLY AND INTERRUPTION METHOD

TECHNICAL FIELD

This disclosure relates generally to a structure that, in response to a loading event, moves to electrically decouple a traction battery from an electric machine. The decoupling can quickly disconnect high-voltage from the traction battery and inhibit flow of electrical energy from the traction battery.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

SUMMARY

A traction battery assembly according to an exemplary aspect of the present disclosure includes a traction battery, an electric machine, an electrical harness assembly, a protrusion adjacent the electrical harness assembly. The protrusion is configured to move from a first position to a second position in response to a loading event. When the protrusion is in the first position, the electric machine is electrically coupled to the traction battery through the electrical harness assembly. When the protrusion is in the second position, the electric machine is electrically decoupled from the traction battery.

In another example of the foregoing assembly, the protrusion is a tab of a housing of the electric machine.

In another example of any of the foregoing assemblies, the tab is a locator.

In another example of any of the foregoing assemblies, the tab includes an aperture configured to receive a lift hook.

In another example of any of the foregoing assemblies, the housing is aluminum.

In another example of any of the foregoing assemblies, the protrusion is an extension of a vehicle.

In another example of any of the foregoing assemblies, the electrical harness assembly includes a connector and a plurality of cable. The protrusion in the second position directly contacts the connector, the plurality of cables, or both.

In another example of any of the foregoing assemblies, the protrusion in the second position directly contacts an interface between the connector and the plurality of cables.

In another example of any of the foregoing assemblies, the plurality of cables are electrically decoupled from the connector when the protrusion is in the second position.

In another example of any of the foregoing assemblies, moving the protrusion to the second position cantilevers the connector.

In another example of any of the foregoing assemblies, the connector is a High-Voltage Interlock Loop connector.

In another example of any of the foregoing assemblies, the connector is a ninety-degree connector.

In another example of any of the foregoing assemblies, the electric machine is a traction motor that is aft the traction battery within an electrified vehicle.

A traction battery circuit interruption method according to another exemplary aspect of the present disclosure includes, among other things, electrically coupling an electric machine to a traction battery using an electrical harness assembly, and in response to a loading event, moving a protrusion from a first position to a second position. When the protrusion is in the first position, the electric machine is electrically coupled to the traction battery through the electrical harness assembly. When the protrusion is in the second position, the electric machine is electrically decoupled from the traction battery.

In another example of the foregoing method, the protrusion is an extension of a housing of the electric machine.

In another example of any of the foregoing methods, moving the protrusion from the first position to the second position cantilevers a connector of the electrical harness assembly to decouple the electrical harness assembly from the traction battery.

In another example of any of the foregoing methods, the protrusion is spaced from a connector of the electrical harness assembly when the protrusion is in the first position. The protrusion directly contacts the connector when the protrusion is in the second position.

Another example of any of the foregoing methods includes using the protrusion as a lift-aid.

Another example of any of the foregoing methods includes using the protrusion as a locator during assembly of the electric machine.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details structural features that help to manage electrical energy within an electrified vehicle.

Figure 1:
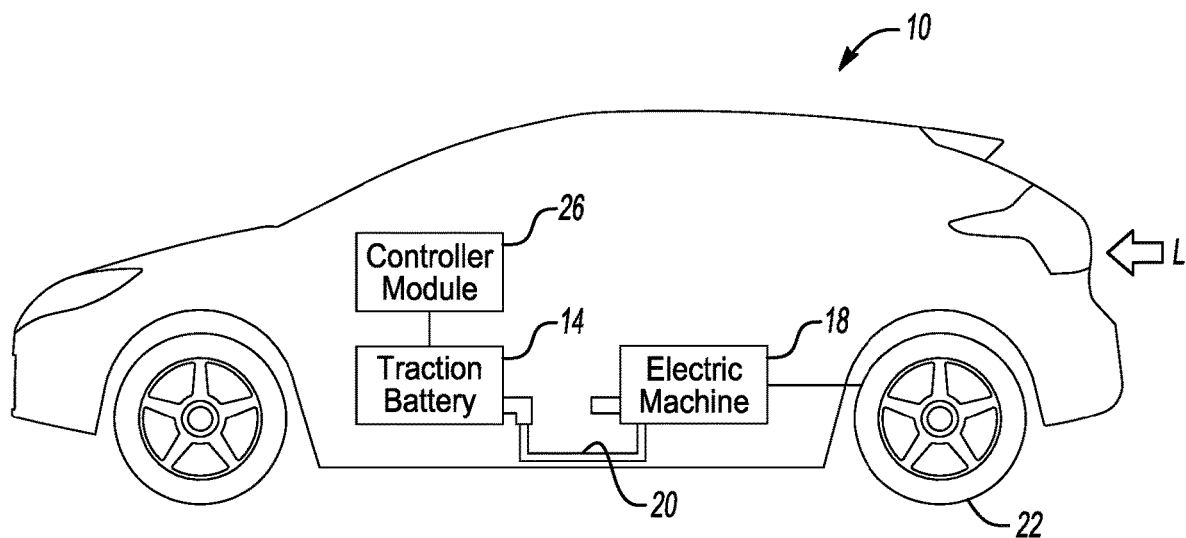
FIG. 1 illustrates a side view of an example electrified vehicle.
Figure 2:
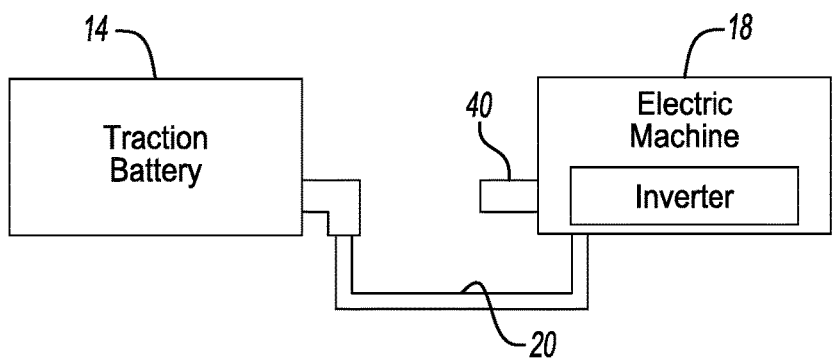
FIG. 2 illustrates a highly schematic view of the electrified vehicle of FIG. 1.
Figure 3:
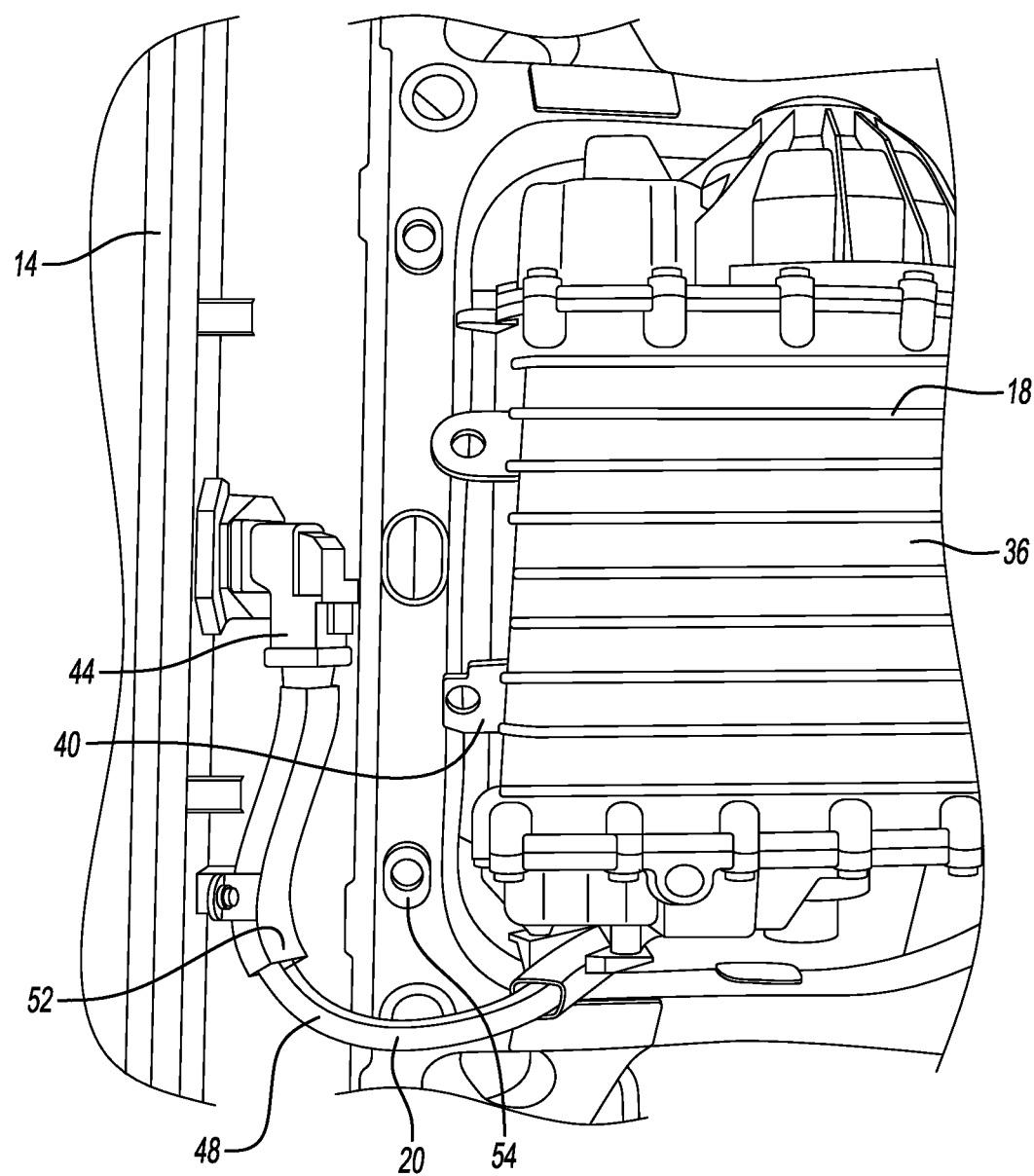
FIG. 3 illustrates a bottom view of selected portions of the electrified vehicle of FIG. 1 and, in particular, portions of a traction battery and a protrusion provided on a housing of an electric machine.
Figure 4:
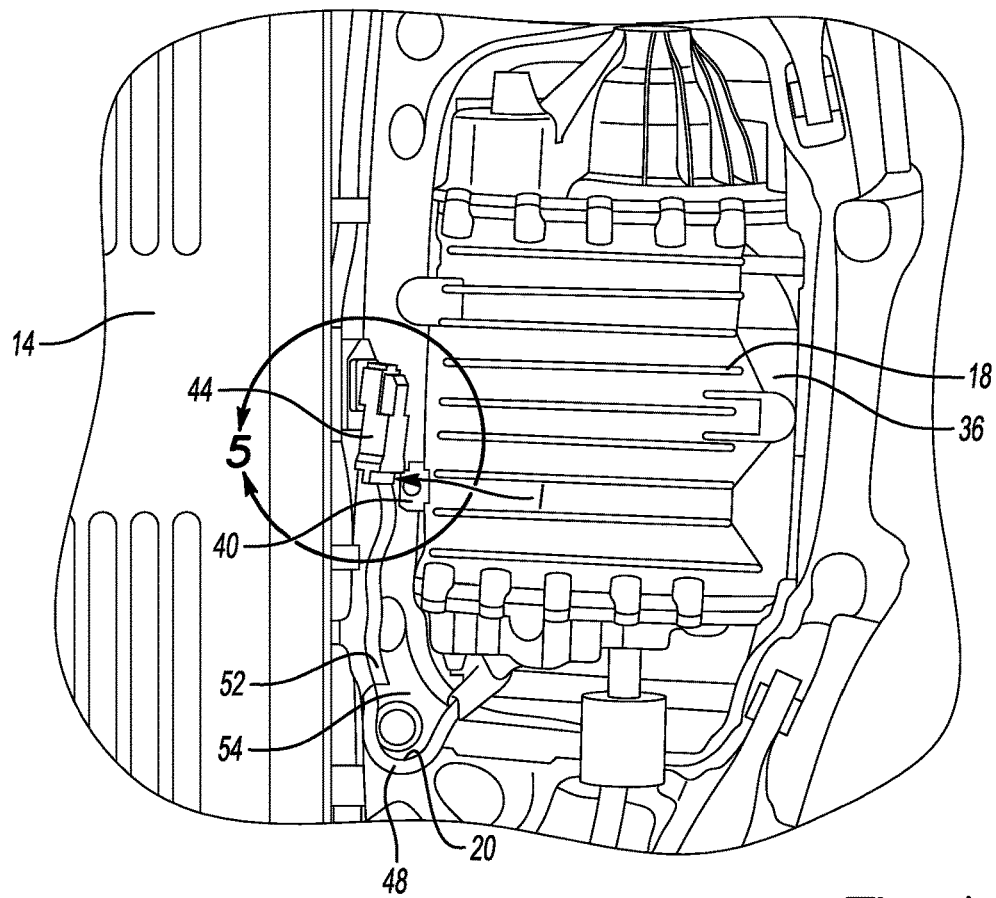
FIG. 4 illustrates the areas of FIG. 3 after a loading event is applied to a rear of the electrified vehicle.
Figure 5:
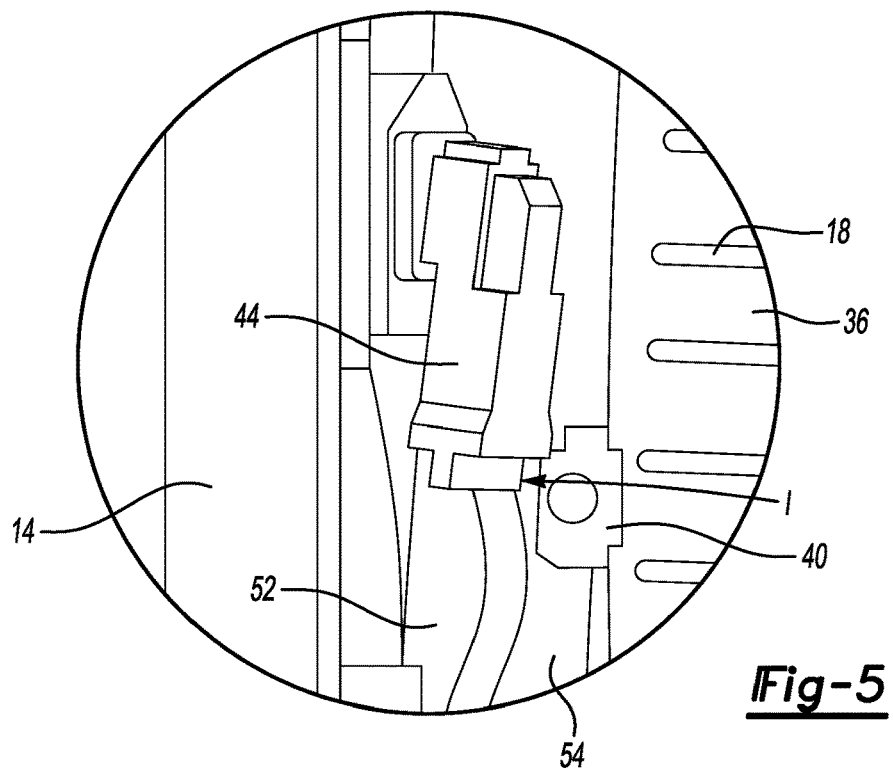
FIG. 5 illustrates a close-up of area 5 in FIG. 4.

Referring to FIG. 1, an example electrified vehicle 10 includes a battery 14, an electric machine 18, wheels 22, and a controller module 26.

In this example, the electric machine 18 can receive electric power from the battery 14. The electric machine 18 is a traction motor that converts electric power to torque to drive the wheels 22. The exemplary battery 14 is a relatively high-voltage traction battery.

An electrical harness assembly 20 is coupled to the traction battery 14 and the electric machine 18. The traction battery 14 powers the electric machine 18 through the electrical harness assembly 20.

The exemplary vehicle 10 is an all-electric vehicle. In other examples, the electrified vehicle 10 is a hybrid electric vehicle, which selectively drives wheels using torque provided by an internal combustion engine instead of, or in addition to, the electric machine 18.

The exemplary vehicle 10 includes a single electric machine. In other examples, the vehicle 10 could include more than one electric machine. The electric machine 18 of the vehicle 10 is aft the traction battery 14 relative to an orientation of the vehicle 10.

The vehicle 10 can experience loading events due to, for example, another vehicle contacting the vehicle 10. In an example, a load L is applied to a rear of the vehicle 10 due to a loading event. The load L causes the electric machine 18 to move closer to the traction battery 14.

The vehicle 10 includes features that help to control high-voltage during and after the loading event. For example, in response to sensors detecting the loading event, the controller module 26 can automatically command contactors of the traction battery 14 to open, which reduces electrical energy flowing from the traction battery 14 to other areas of the vehicle 10.

In the exemplary embodiment, the vehicle 10 includes other features used to control high-voltage. For example, with reference to FIGS. 2-5 a housing 36 of the electric machine 18 includes a protrusion 40 that is adjacent to the electrical harness assembly 20 prior to the loading event. The load shifts the electric machine 18 relatively toward the traction battery 14 causing the protrusion 40 to directly contact the electrical harness assembly 20. The protrusion 40 ruptures the electrical harness assembly 20. The electrical harness assembly 20, once ruptured, is then unable to carry electrical energy to the electric machine 18, which helps to contain the high-voltage within the traction battery 14.

The electrical harness assembly 20 includes a connector 44 and a plurality of cables 48. The cables 48 extend from the connector 44, which is a ninety-degree style connector that couples directly to the traction battery 14. A guide 52 helps to hold and control the position of the cables 48 where the cables 48 extend from the connector 44.

The connector 44 is a High-Voltage Interlock Loop connector. As would be understood by a person having skill in this art, such the connector 44 can couple with a connector of the traction battery 14. When coupled, pins on the connector 44 are received within terminals of the connector of the traction battery 14. When the connector 44 is displaced such that the pins are pulled out of the terminals, the controller module 26 opens contactors of the traction battery 14 to cut off high-voltage to the connector 44.

The connector 44 can be finger-proof. Even after the rupture of the electrical harness assembly 20, the connector 44 can block contact with internal areas of the connector 44. The connector 44 can, in some examples, send a signal to the controller module 26 when the rupture is detected. The controller module 26 can open contactors within the traction battery 14 to reduce high voltage electrical energy flowing from the traction battery 14.

The protrusion 40 is sized and positioned to directly contact and press against an interface I between the connector 44 and the cables 48 when the load L is applied.

Pressing the protrusion 40 against the interface I electrically decouples the cables 48 from the connector 44, which electrically decouples the electric machine 18 from the traction battery 14. The electrical decoupling quickly disconnects High Voltage (HV) and inhibits flow of electrical energy from the traction battery 14.

While the protrusion 40 is part of the housing 36, the protrusion 40 could instead be located in other areas or part of another structure. The protrusion 40 could extend from a frame 54 of the vehicle 10, for example.

Prior to the loading event, the protrusion 40 is in a first position where the protrusion 40 is adjacent to, but spaced from the electrical harness assembly 20. The electrical harness assembly 20 electrically couples the electric machine 18 to the traction battery 14 when the protrusion 40 is in the first position.

After the load L moves the protrusion 40 from the first position to a different, second position, the protrusion 40 has ruptured the electrical harness assembly 20. When the protrusion 40 is in the second position, the electric machine 18 is electrically decoupled from the traction battery 14. An interruption method utilizing the protrusion 40 includes, in response to the loading event, moving the protrusion 40 from the first position to the second position.

In this example, the protrusion 40 in the second position directly contact both the connector 44 and the cables 48 at the interface I between the connector 44 and the cables 48. Moving the protrusion 40 to the second position cantilevers the connector 44. In other examples, the protrusion 40 directly contacts the connector 44 or the cables 48.

In the exemplary embodiment, the protrusion 40 is a tab or extension of the housing 36 of the electric machine 18. The housing 36 is aluminum in this example. The housing 36 can hold an inverter 60 along with other components of the electric machine 18. The housing 36 can be cast.

In particular, the example protrusion 40 protrudes from the surrounding portions of the housing 36 and includes an aperture 64 The example protrusion 40, with the aperture 64, is used as an assembly aid. In particular, the protrusion 40 can be used as a locator and lift-aid during assembly of the electric machine 18 and vehicle 10. The aperture 64 can receive a lift hook, for example. The protrusion 40 can be used to located and restrain the housing 36 on a manufacturing line pallet during the assembly of various internal components inside the electric machine 18.

Features of the exemplary embodiments include a system incorporating multiple ways to inhibit flow of electrical energy from a traction battery pack when a vehicle having the traction battery pack experiences a loading event. First, a controller can open contactors in response to sensors detecting a loading event. Second, the controller can open contactors in response to a rupture of a HVIL circuit. Third, a protrusion can physically rupture a contactor to electrically decouple the contactor from the traction battery.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A traction battery assembly, comprising:
   a traction battery;
   an electric machine, the electric machine a traction motor of an electrified vehicle;
   an electrical harness assembly; and a protrusion adjacent the electrical harness assembly, the protrusion configured to move from a first position to a second position in response to a loading event, when the protrusion is in the first position, the protrusion is spaced a distance from the electrical harness assembly, and the electric machine is electrically coupled to the traction battery through the electrical harness assembly, when the protrusion is in the second position, the electric machine is electrically decoupled from the traction battery.

2. The traction battery assembly of claim 1, wherein the protrusion is a tab of a housing of the electric machine.

3. The traction battery assembly of claim 2, wherein the tab is a locator.

4. The traction battery assembly of claim 2, wherein the tab includes an aperture configured to receive a lift hook.

5. The traction battery assembly of claim 2, wherein the housing is aluminum.

6. The traction battery assembly of claim 1, wherein the protrusion is an extension of a vehicle frame.

7. The traction battery assembly of claim 1, wherein the traction motor is aft the traction battery within the electrified vehicle.

8. A traction battery assembly, comprising:
a traction battery;
an electric machine, the electric machine a traction motor of an electrified vehicle;
an electrical harness assembly; and
a protrusion adjacent the electrical harness assembly, the protrusion configured to move from a first position to a second position in response to a loading event,
when the protrusion is in the first position, the electric machine is electrically coupled to the traction battery through the electrical harness assembly,
when the protrusion is in the second position, the electric machine is electrically decoupled from the traction battery,
wherein the electrical harness assembly includes a connector and a plurality of cables, wherein, when the protrusion is in the first position, the protrusion is spaced a distance from all portions of the electrical harness assembly, wherein, when the protrusion is in the second position, the protrusion directly contacts the connector, the plurality of cables, or both.

9. The traction battery assembly of claim 8, wherein, when the protrusion is in the second position, the protrusion directly contacts an interface between the connector and the plurality of cables.

10. The traction battery assembly of claim 8, wherein the plurality of cables are electrically decoupled from the connector when the protrusion is in the second position.

11. The traction battery assembly of claim 8, wherein moving the protrusion to the second position cantilevers the connector.

12. The traction battery assembly of claim 8, wherein the connector is a High-Voltage Interlock Loop connector.

13. The traction battery assembly of claim 8, wherein the connector is a ninety-degree connector.

14. A traction battery circuit interruption method, comprising:
electrically coupling an electric machine to a traction battery using an electrical harness assembly, the electric machine a traction motor of an electrified vehicle; and
in response to a loading event, moving a protrusion from a first position to a second position,
when the protrusion is in the first position, the electric machine is electrically coupled to the traction battery through the electrical harness assembly, wherein the protrusion is spaced from a connector of the electrical harness assembly when the protrusion is in the first position,
when the protrusion is in the second position, the electric machine is electrically decoupled from the traction battery, wherein the protrusion directly contacts the connector when the protrusion is in the second position.

15. The traction battery circuit interruption method of claim 14, wherein the protrusion is an extension of a housing of the electric machine.

16. The traction battery circuit interruption method of claim 14, wherein moving the protrusion from the first position to the second position cantilevers a connector of the electrical harness assembly to decouple the electrical harness assembly from the traction battery.

17. The traction battery circuit interruption method of claim 14, further comprising using the protrusion as a lift-aid.

18. The traction battery circuit interruption method of claim 14, further comprising using the protrusion as a locator during assembly of the electric machine.

* * * * *